(12) United States Patent
Brown et al.

(10) Patent No.: US 9,330,168 B1
(45) Date of Patent: May 3, 2016

(54) SYSTEM AND METHOD FOR IDENTIFYING WEBSITE VERTICALS

(71) Applicant: Go Daddy Operating Company, LLC, Scottsdale, AZ (US)

(72) Inventors: Robert Brown, Phoenix, AZ (US); Tapan Kamdar, San Jose, CA (US); Ryan Kirkish, Gilbert, AZ (US); Wei-Cheng Lai, Cupertino, CA (US); Jeff McLellan, Phoenix, AZ (US)

(73) Assignee: Go Daddy Operating Company, LLC, Scottsdale, AZ (US)

(*) Notice: Subject to any disclaimer, the term of this patent is extended or adjusted under 35 U.S.C. 154(b) by 0 days.

(21) Appl. No.: 14/180,273

(22) Filed: Feb. 13, 2014

Related U.S. Application Data

(63) Continuation-in-part of application No. 13/616,434, filed on Sep. 14, 2012, now Pat. No. 9,058,393, and a continuation-in-part of application No. 13/616,505, filed on Sep. 14, 2012, now Pat. No. 8,909,558, which is a continuation-in-part of application No. 12/894,519, filed on Sep. 30, 2010, now Pat. No. 8,515,969, which is a continuation-in-part of application No. 12/708,752, filed on Feb. 19, 2010, now abandoned, and a continuation-in-part of application No. 12/708,775, filed on Feb. 19, 2010, now abandoned, and a continuation-in-part of application No. 12/708,793, filed on Feb. 19, 2010, now Pat. No. 8,447,701, and a continuation-in-part of application No. 12/708,809, filed on Feb. 19, 2010, now Pat. No. 8,447,702.

(51) Int. Cl.
*G06F 17/30* (2006.01)

(52) U.S. Cl.
CPC ...... *G06F 17/3071* (2013.01); *G06F 17/30873* (2013.01)

(58) Field of Classification Search
None
See application file for complete search history.

(56) References Cited

U.S. PATENT DOCUMENTS

| | | |
|---|---|---|
| 6,332,158 B1 | 12/2001 | Risley et al. |
| 6,876,997 B1 | 4/2005 | Rorex et al. |
| 6,895,430 B1 | 5/2005 | Schneider |
| 7,565,630 B1 | 7/2009 | Kamvar et al. |

(Continued)

OTHER PUBLICATIONS

Kwon, Text categorization based on k-nearest neighbor approach for Web site classification, Information Processing and Management 39 (2003), pp. 25-44.*

(Continued)

*Primary Examiner* — Albert Phillips, III
(74) *Attorney, Agent, or Firm* — Quarles & Brady LLP

(57) ABSTRACT

Systems and methods for the categorization of websites are presented. A website is categorized using one or a combination of its domain name and its web page content. The domain name is tokenized, and the tokens compared to categories in a category structure to determine probabilities that the token belongs to each category. Combinations of tokens are similarly compared to the categories. A category may be determined with reference to a vector space in which a training set of websites having known categories is converted according to a methodology into reference vectors containing keyword frequencies. A target website is converted to a target vector using the same methodology, and a distance score of the target vector to each reference vector is calculated. The website represented by the target vector is assigned the category of the reference vector having the lowest distance score.

20 Claims, 7 Drawing Sheets

(56) References Cited

U.S. PATENT DOCUMENTS

| | | | |
|---|---|---|---|
| 2002/0194373 A1 | 12/2002 | Choudhry | |
| 2003/0149690 A1 | 8/2003 | Kudlacik et al. | |
| 2005/0125451 A1 | 6/2005 | Mooney | |
| 2005/0144069 A1* | 6/2005 | Wiseman | G06Q 30/02 705/14.41 |
| 2007/0100803 A1* | 5/2007 | Cava | G06F 17/3064 |
| 2007/0250468 A1* | 10/2007 | Pieper | 707/1 |
| 2008/0040329 A1 | 2/2008 | Cussen et al. | |
| 2008/0222125 A1 | 9/2008 | Chowdhury | |
| 2009/0241066 A1 | 9/2009 | Costello | |
| 2009/0292696 A1 | 11/2009 | Shuster | |
| 2010/0070448 A1 | 3/2010 | Omoigui | |

OTHER PUBLICATIONS

Ozgur, Text Categorization with Class-Based and Corpus-Based Keyword Selection, 2005, pp. 606-615.*

Bickel, Multi-View Clustering, 2004, pp. 1-8.*

Google SafeSearch Filtering (http://web.archive.org/web/20030702191745/http://www.google.com/intl/en/help/customize.html), Jul. 2003, WaybackMachine.

"Domain Name Search." Jan. 31, 2001. www.domainsearch.com.

Chaker, Genre categorization of web pages, 2007, pp. 455-464.

Non-Final Office Action mailed Jan. 2, 2015 for U.S. Appl. No. 14/180,249, 16 pages.

* cited by examiner

SYSTEM AND METHOD FOR IDENTIFYING WEBSITE VERTICALS

CROSS-REFERENCE TO RELATED APPLICATIONS

This application is a continuation-in-part and claims the benefit of U.S. patent application Ser. Nos. 13/616,434 and 13/616,505, both filed on Sep. 14, 2012, and both of which are continuations-in-part of U.S. patent application Ser. No. 12/894,519, filed Sep. 30, 2010, now U.S. Pat. No. 8,515,969, which is a continuation-in-part of U.S. patent application Ser. Nos. 12/708,752, 12/708,775, 12/708,793, and 12/708,809, all filed Feb. 19, 2010, all of which related applications are incorporated herein by reference.

FIELD OF THE INVENTION

The present invention relates generally to the categorization of websites and, more particularly, to systems and methods for determining one or more categories relevant to a website based on words within the domain name or website content.

BACKGROUND OF THE INVENTION

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers place multimedia information (e.g., text, graphics, audio, video, animation, and other forms of data) at specific locations on the Internet referred to as web pages. Websites comprise a collection of connected, or otherwise related, web pages. The combination of all the websites and their corresponding web pages on the Internet is generally known as the World Wide Web (WWW) or simply the Web.

Some Internet users, typically those that are larger and more sophisticated, may provide their own hardware, software, and connections to the Internet. But many Internet users either do not have the resources available or do not want to create and maintain the infrastructure necessary to host their own websites. To assist such individuals (or entities), hosting companies exist that offer website hosting services. These hosting service providers typically provide the hardware, software, and electronic communication means necessary to connect multiple websites to the Internet. A single hosting service provider may literally host thousands of websites on one or more hosting servers.

Browsers are able to locate specific websites because each website, resource, and computer on the Internet has a unique Internet Protocol (IP) address. Presently, there are two standards for IP addresses. The older IP address standard, often called IP Version 4 (IPv4), is a 32-bit binary number, which is typically shown in dotted decimal notation, where four 8-bit bytes are separated by a dot from each other (e.g., 64.202.167.32). The notation is used to improve human readability. The newer IP address standard, often called IP Version 6 (IPv6) or Next Generation Internet Protocol (IPng), is a 128-bit binary number. The standard human readable notation for IPv6 addresses presents the address as eight 16-bit hexadecimal words, each separated by a colon (e.g., 2EDC:BA98:0332:0000:CF8A:000C:2154:7313).

IP addresses, however, even in human readable notation, are difficult for people to remember and use. A Uniform Resource Locator (URL) is much easier to remember and may be used to point to any computer, directory, or file on the Internet. A browser is able to access a website on the Internet through the use of a URL. The URL may include a Hypertext Transfer Protocol (HTTP) request combined with the website's Internet address, also known as the website's domain name. An example of a URL with a HTTP request and domain name is: http://www.companyname.com. In this example, the "http" identifies the URL as a HTTP request and the "companyname.com" is the domain name.

Domain names are easier to remember and use than their corresponding IP addresses. The Internet Corporation for Assigned Names and Numbers (ICANN) approves some Generic Top-Level Domains (gTLD) and delegates the responsibility to a particular organization (a "registry") for maintaining an authoritative source for the registered domain names within a TLD and their corresponding IP addresses. For certain TLDs (e.g., .biz, .info, .name, and .org) the registry is also the authoritative source for contact information related to the domain name and is referred to as a "thick" registry. For other TLDs (e.g., .com and .net) only the domain name, registrar identification, and name server information is stored within the registry, and a registrar is the authoritative source for the contact information related to the domain name. Such registries are referred to as "thin" registries. Most gTLDs are organized through a central domain name Shared Registration System (SRS) based on their TLD.

The process for registering a domain name with .com, .net, .org, and some other TLDs allows an Internet user to use an ICANN-accredited registrar to register their domain name. For example, if an Internet user, John Doe, wishes to register the domain name "mycompany.com," John Doe may initially determine whether the desired domain name is available by contacting a domain name registrar. The Internet user may make this contact using the registrar's webpage and typing the desired domain name into a field on the registrar's webpage created for this purpose. Upon receiving the request from the Internet user, the registrar may ascertain whether "mycompany.com" has already been registered by checking the SRS database associated with the TLD of the domain name. The results of the search then may be displayed on the webpage to thereby notify the Internet user of the availability of the domain name. If the domain name is available, the Internet user may proceed with the registration process. If the domain name is not available for registration, the Internet user may keep selecting alternative domain names until an available domain name is found.

For Internet users and businesses alike, the Internet continues to be increasingly valuable. More people use the Web for everyday tasks, from social networking, shopping, banking, and paying bills to consuming media and entertainment. E-commerce is growing, with businesses delivering more services and content across the Internet, communicating and collaborating online, and inventing new ways to connect with each other. Frequently, e-commerce websites are hosted at domain names containing one or more words that are relevant to the services offered on the website, such as "autoinsurancedeals.com" for automobile insurance services. It would be advantageous to automatically identify one or more categories of a business based on words within a domain name at which the business's website is hosted, in order to offer website, e-commerce, and other business services that are relevant to the business.

It would be further advantageous to categorize all or a subset of the websites on the Internet according to a standardized categorization scheme. Categorizing the websites on the Internet generates data that can be analyzed to determine usage trends of the Internet across substantially any industry and any geographic region. One known method of categorizing websites is directed to a particular set of TLDs and uses the North American Industry Classification System (NAICS) to classify business websites according to the type of economic activity. However, this method only classifies websites to the 3-digit code level of specificity. The 3-digit NAICS code specifies the largest business sector and subsector of the business, but leaves out the remaining 1-3 digits of the NAICS code that include the industry group and NAICS and national industry identifiers. Furthermore, the method requires manual entry of the NAICS code or identifiable business sector information for each website. Due to the large and increasing number of websites, currently over 100 million, manual categorization of even ten percent of existing websites could take several years to complete. An automated and more specific categorization method is needed.

DETAILED DESCRIPTION

Figure 1:
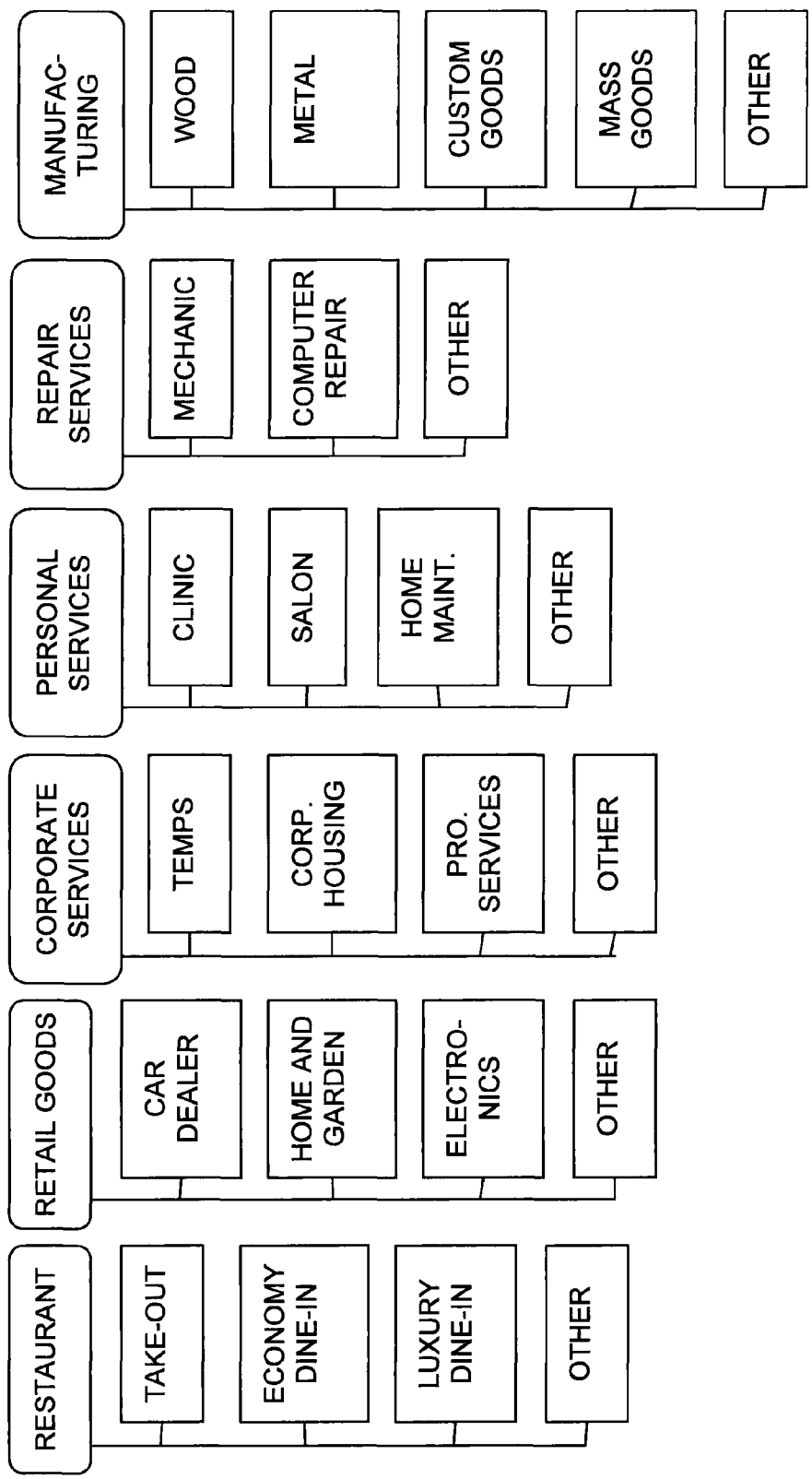
FIG. 1 illustrates a possible embodiment of a category structure for categorizing websites.

The present invention overcomes the drawbacks described above by providing a system and method for categorizing websites that analyzes one or both of the website's domain name and the website's content and determines a proper categorization based on keywords identified therein. The server computer tasked with categorizing the website, herein referred to as the web server, may perform one or more algorithms for the website categorization. Alternatively, the web server may assign one or more of the categorization tasks to a related computer system, such as another web server, collection of web or other servers, a dedicated data processing computer, or another computer capable of performing the categorization algorithms. Alternatively, a standalone program may be delivered to and installed on one or more personal computing devices, and the standalone program may be configured to cause the personal computing devices to perform the categorization algorithms either alone or in a distributed computation environment that uses a plurality of computer systems to categorize websites cooperatively. For clarity of explanation, and not to limit the implementation of the present methods, the methods are described below as being performed by a web server.

In one implementation, the present disclosure provides a method that includes receiving one or more tokens that together form all or part of a string, the string being an input related to a website. The input may be a domain name or one or more keywords obtained from the website. The method further includes comparing each of the tokens to each category in a category structure to determine a token probability that the token belongs to the category. The method further includes calculating a final probability of the string belonging to each category and categorizing the token in the category having the highest final probability. Comparing each of the one or more tokens to each of the categories may include applying a string matching algorithm to match the one or more tokens to the categories. Each of the categories in the category structure may include a category title and a set of keywords, and comparing each of the tokens to each of the categories may include applying a string matching algorithm to match the tokens to the category title or to one or more keywords of the set of keywords. The method may further include collecting a plurality of keywords for the set of keywords of each category, and one or more of the plurality of keywords for one or more of the categories may be obtained from one or more domain names previously categorized in the category.

Calculating the final probability for each category may include averaging, of all of the tokens, the token probabilities for the category. Calculating the final probability for each category may further include determining, from a supplemental data model, a coefficient for each token and modifying the token probability for each token by the token's coefficient before averaging the token probabilities. The method may further include comparing each combination of two or more of the tokens to each category in the category structure to determine a joint probability that the combination of tokens belongs to the category, and the final probability may include a compilation of the joint probabilities. Calculating the final probability for each category may include averaging together, of all of the tokens, the token probabilities and the joint probabilities for the category. Calculating the final probability for each category may further include determining, from a supplemental data model, a coefficient for each token and each combination of tokens and modifying the token probability for each token and the joint probability for each combination of tokens by the token's coefficient before averaging the token probabilities.

Where the input is one or more keywords obtained from the website, comparing each of the one or more tokens to each category in the category structure may include converting the website into a target vector representing the website. The target vector may comprise elements signifying the appearance of the tokens on the website. Comparing each of the one or more tokens to each category in the category structure may further include comparing the target vector to a plurality of reference vectors having known assigned categories of a category structure. Calculating the final probability of the string belonging to each category may include determining the closest matching reference vector to the target vector. Determining the closest matching reference vector to the target vector may include calculating a distance score of each of the reference vectors from the target vector, the closest matching reference vector having the lowest distance score. The distance score may be calculated using cosine similarity.

In another implementation, the present disclosure provides a system that includes at least one server computer in communication with a network and including a processor configured to receive one or more tokens together forming all or part of a string comprising an input related to a website, compare each of the one or more tokens to each category in a category structure to determine a token probability that the token belongs to the category, calculate a final probability of the string belonging to each category, and categorize the token in the category having the highest final probability. The processor may be further configured to compare each combination of two or more of the tokens to each category in the category structure to determine a joint probability that the combination of tokens belongs to the category, the final probability including a compilation of the joint probabilities. The input may be a domain name, or the input may be one or more keywords obtained from the website.

In one implementation, the present disclosure provides a method that includes receiving an input related to a target website, converting the input into a target vector representing the target website, comparing the target vector to a plurality of reference vectors each being assigned one or more categories of a category structure, and assigning the assigned one or more categories of the closest matching reference vector to the target website. The target vector may comprise elements signifying the appearance of a plurality of keywords within the input, the plurality of keywords being selected from a corpus of websites. The input may be a string comprising one or more of the plurality of keywords. The input may be the target website. The corpus of websites may include all publicly available websites on the Internet, or may include all publicly available websites previously categorized in one or more of the categories, or may include all publicly available websites previously categorized in one or more of the categories that are assigned to one or more of the reference vectors. The plurality of keywords may be obtained by scraping the websites of the corpus for website data and identifying the keywords from the website data.

The target vector may be an array having an element for each keyword. The value of each element may be a term frequency-inverse document frequency (TF-IDF) score for the keyword. The TF-IDF score may be calculated from the input and the corpus of websites. The method may further include receiving a training set of websites, receiving assigned categories for each of the websites in the training set, and converting each of the websites in the training set into one of the reference vectors. Each of the reference vectors may comprise elements signifying the appearance of the plurality of keywords on the associated website. The method may further include calculating an IDF for each of the plurality of keywords by: calculating the number of websites in the corpus that contain the keyword, the corpus including the websites in the training set and one or both of the input and the target website; calculating a document frequency comprising the number of websites in the corpus that contain the keyword divided by the number of websites in the corpus; and calculating the natural logarithm of the document frequency to obtain the IDF. The methods of converting the input into the target vector and converting each of the websites in the training set into one of the reference vectors may each include: creating a vector containing an element for each of the plurality of keywords, the vector being the target vector or one of the reference vectors; and, for each keyword: counting the number of appearances of the keyword in the input if the vector is the target vector or on one of the websites in the training set if the vector is one of the reference vectors; multiplying the number of appearances of the keyword by the IDF of the keyword to obtain a TF-IDF score for the keyword; and storing the TF-IDF score in the element of the vector associated with the keyword.

Comparing the target vector to the plurality of reference vectors may include calculating a distance score of each of the reference vectors from the target vector, the closest matching reference vector having the lowest distance score. Calculating the distance score for each reference vector may include calculating the target vector norm, calculating the reference vector norm, calculating the dot product of the target vector and the reference vector, dividing the dot product by the product of the target vector norm and the reference vector norm to obtain a cosine similarity value, and calculating the arccosine of the cosine similarity value to obtain the distance score.

In another implementation, the present disclosure provides a method that includes receiving a string that is an input identifying a target website, parsing the string into one or more tokens, converting the target website into a target vector representing the target website, comparing the target vector to a plurality of reference vectors having known assigned categories of a category structure to determine the closest matching reference vector to the target vector, and assigning the assigned categories of the closest matching reference vector to the target website. The target vector may comprise elements signifying the appearance of a plurality of keywords on the target website, the plurality of keywords being selected from a corpus of websites and including the tokens.

In another implementation, the present disclosure provides a system that includes at least one server computer in communication with a network and including a processor configured to receive an input related to a target website, convert the input into a target vector representing the target website, compare the target vector to a plurality of reference vectors each being assigned one or more categories of a category structure, and assign the assigned one or more categories of the closest matching reference vector to the target website. The target vector may comprise elements signifying the appearance of a plurality of keywords within the input, the plurality of keywords being selected from a corpus of websites. The corpus may include all publicly available websites on the Internet. Comparing the target vector to the plurality of reference vectors may include calculating a distance score of each of the reference vectors from the target vector, the closest matching reference vector having the lowest distance score. The input may be the target website.

In general, the present system allows for the categorization of a website according to a category structure and based on one or more characteristics of the website. The category structure may be any suitable hierarchy of categories that provides a useful identification of the type of content on the website, arranged to any suitable level of granularity. One example of a category structure divides websites into basic categories: news; ecommerce (i.e., commercial entity); social network; government; non-commercial personal services (e.g., medical care); blog; and the like. In an example of finer granularity, shown in FIG. 1, a category structure may divide websites identified as ecommerce into a second "vertical" tier (e.g., restaurant, retail goods, corporate services, personal services, repair services, manufacturing, etc.) that identifies the industry a business serves, and may further divide each vertical into a third tier pertaining to specific business types in each vertical (e.g., the corporate services vertical may be divided into temporary staffing, corporate housing, professional services, etc., and may include a catch-all "other" category). While any suitable category structure may be used, the present categorization methods may operate most efficiently by adopting a standardized structure in order to classify websites on a wide scale. In particular, as described further below, the methods may use the NAICS 4-6 digit classification codes and corresponding category structure.

Several different methods may be used to provide and manage the disclosed invention. In an example embodiment, a user may enter a string of characters into a user interface as a word splitting input on a client computer, possibly seeking more information about a domain name, a spell check database, a search engine suggestion algorithm or any other use for word splitting. The interface may also present the user with the option to choose the number of results to be displayed to the user on the interface on the client from the entered character string. Any combination of software modules used together with hardware on a server computer may receive and analyze the submitted word splitting input, possibly supplemented with additional information from data storage within a data center.

One or more software modules may use this analysis to create a cached micro-dictionary comprising a plurality of micro-dictionary words from the character string. This cached micro-dictionary may be used both to store words derived from the character string as well as compare words within the character string, keyword list, etc. with existing words in the cached micro-dictionary. The count of micro-dictionary words within the cached micro-dictionary may be used to establish a loop count, where the loop count is used to begin each pass through a micro-dictionary loop with a different micro-dictionary word as the first to be used.

This cached micro-dictionary and character string may be passed into an algorithm calculated within one or more software modules executed on a communicatively-coupled server computer and/or client computer. This algorithm may be used to find the largest contiguous word from the string. For each pass through the micro-dictionary loop, a determination may be made as to whether characters still remain in the character string. If so, the steps described in detail below for finding the largest contiguous word, including passing in the character string and the loop count, may be repeated until no characters remain. When it is determined that no characters remain, another iteration of the loop count may begin, where, when the micro-dictionary loop loops back for a new loop count, the new pass begins with a different micro-dictionary word as the first to be used.

For each iteration prior to determining whether characters remain, a three step process may be observed: the largest contiguous word may be found, as detailed herein, the largest contiguous word may be removed from the character string and the largest contiguous word may be added to and stored in a keyword list with the beginning character position.

Duplicate words may be removed, a plurality of reliability scores for a plurality of keyword strings from the keyword list may be calculated and the keywords may be reordered by character position. Keyword strings and reliability scores may then be returned to the user via an interface on the client computer and the keyword strings and reliability scores may be calculated, returned and displayed to the user on the client interface, possibly based on reliability factors, discussed in detail below.

The software modules used in the context of the current invention may be stored in the memory of—and run on—at least one server or client computer. As a non-limiting example of such software modules, one or more word splitting software modules may be used to split the character string into a plurality of keywords and determine, according to information stored in data storage such as a dictionary database, whether words from the dictionary database are found within the character sting (or smaller contiguous strings when finding the largest contiguous word to create keyword strings) for possible purposes of seeking more information about a domain name, a spell check database, a search engine suggestion algorithm or any other use for word splitting.

One or more reliability score software modules may likewise be used to calculate a reliability score for each of one or more word splits derived from the word splitting input and/or character string, etc. The software modules may comprise software and/or scripts containing instructions that, when executed by a microprocessor on a server computer or client computer, cause the microprocessor to accomplish the purpose of the module or the methods disclosed herein, in this example to create one or more splits in a character string input as a word splitting input or calculate a reliability score for each of one or more word splits derived from the word splitting input and/or display this information to the user on an interface on the client computer.

In some embodiments, the web server may perform categorization of a domain name. A domain name is a string of characters that often contains concatenated words from which a contextual relevance of the domain name may be extracted. Where the domain name is registered at ICANN and linked to an existing website, the categorization of the domain name may carry through to the website, and thus the website may be categorized based on its domain name only. In other embodiments, the web server may categorize the domain name and then perform further categorization of the website content as described below, and combine the categorization results to obtain a final categorization. In still other embodiments, the domain name may not yet be registered and therefore may not be related to a website. For example, the domain name may be a potential domain name entered in a domain name search by a user attempting to determine whether the potential domain name is available for registration. The web server may use the categorization results to perform additional functions related to the domain search. For example, the web server may track usage patterns for the domain search function, divided by category to determine the composition of industries the web server's users represent. In another example, where the searched domain name is unavailable for registration, the web server may use the identified category or categories to recommend alternative domain names to the user that are still relevant to the user's category.

Figure 2:
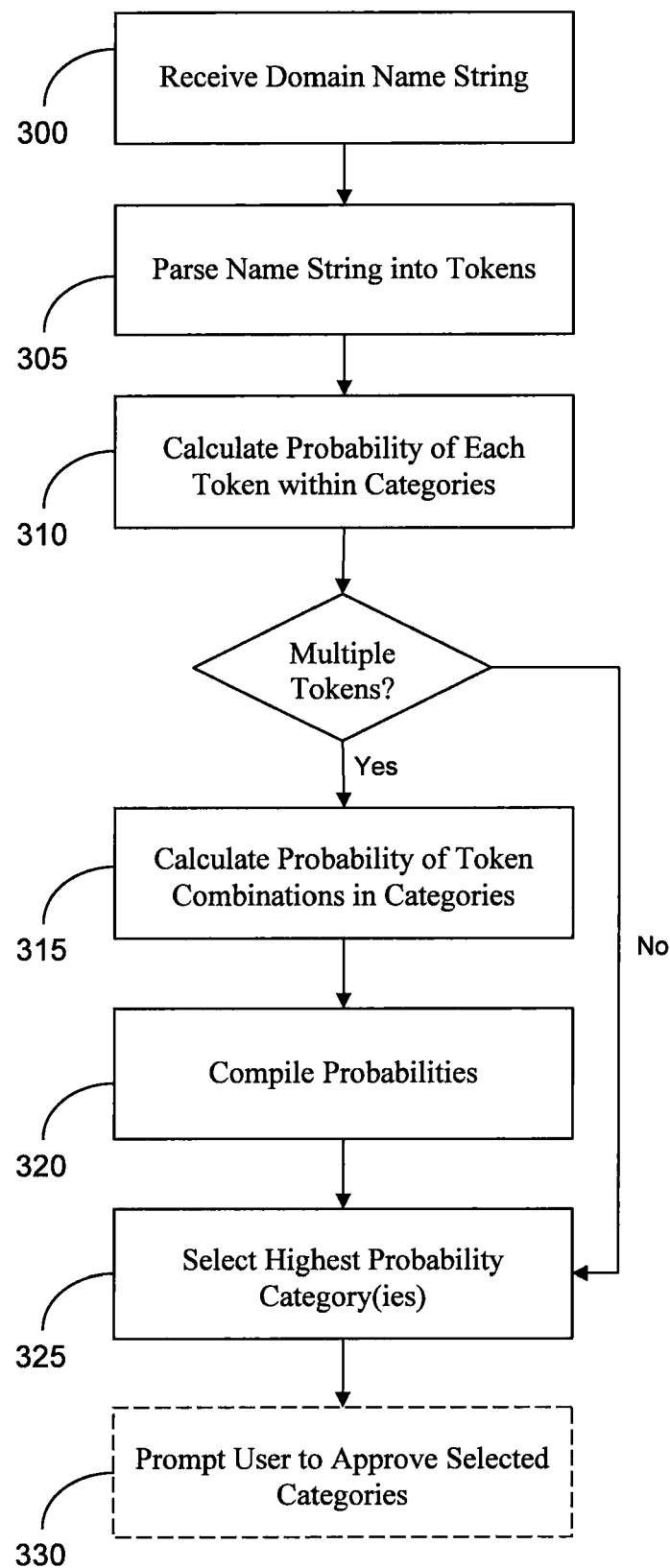
FIG. 2 is a flowchart illustrating a method for categorizing a domain name.

FIG. 2 is a flowchart illustrating a method for categorizing a domain name. At step 300, the web server receives the domain name as a string of characters. The domain name may be received via a domain name search as described above, from another user data entry event, or from an automated acquisition of the domain name from a pool of uncategorized registered domain names or another list of domain names. At step 305, the web server may parse the domain name string into one or more tokens. A token in this context is a potential word identified as a substring within the arrangement of letters in the string. Tokens may be identified, using any suitable string matching algorithm, by matching the substrings of the domain name string against one or more dictionaries (e.g., English dictionary, equivalent dictionaries in other languages, slang or jargon glossary or dictionary, dictionary generated from one or more data sources such as global or regional web usage logs in any language, and the like) or one or more sets of keywords that are relevant to the categories in the category structure. Thus, tokens identified from the domain name "adamscarsales.com" may include "adams car sales," "adams cars ales," "adam scar sales," and "adam scars ales," and potentially erratic combinations like "adamscars ales" where particularly relevant keywords (such as a category title, as opposed to commonly appearing keywords as described below) are present.

A set of keywords that is relevant to a particular category may be developed using one or more of several keyword collection methods. One method may be manual entry of keywords into the set. Another method may be adding, as keywords, tokens from domain names that are categorized either directly or through categorization of the website hosted at the domain name, as described below. Another method may be identifying keywords using one or more search engine optimization technologies, such as GOOGLE Analytics. The web server may additionally or alternatively use any of the methods described in co-pending U.S. patent application Ser. No. 14/010,294, entitled "METHOD FOR AUTOMATING SEARCH ENGINE OPTIMIZATION FOR WEBSITES" and commonly owned by the Applicant for the present invention, to develop the keyword sets.

With the tokens identified, at step 310 the web server may calculate, for each discrete token, a token probability for each category in the category structure or a subset thereof (e.g., one or more tiers or one or more hierarchical trees of the category structure). The token probability is the probability that the token is relevant to the category. The token probability can be expressed in any suitable weighted, non-weighted, or relative scale. The token probability is higher in a category as the frequency of the token's appearance as a keyword or a part of a keyword phrase increases. The token probability is also higher for categories where the token matches or substantially matches all or a portion of the category title itself, as compared to categories where the token does not appear in the title. Thus, for example, the token "automobile" may have a higher token probability under categories such as "auto repair," "auto sales," "auto glass," "insurance," and other automotive-related categories, and a lower token probability in categories such as "film and production," "aviation," and categories that are not directly related to automobiles. In contrast, the token "car" may have a token probability that is equally or nearly as high as "automobile" for the categories of "auto repair," "auto sales," "auto glass," "insurance," and the like, and may have a higher probability than "automobile" in the "film and production" category due to the higher frequency of the word "car" appearing in movie titles, movie genres, Internet searches for movies, and other film-related Internet resources that may be used to develop the keyword set for the "film and production" category.

The token's appearance in a category title or keyword set may be determined by string-matching the token against the titles and keywords in a manner similar to the string matching of step 305. A string matching algorithm may therefore be used to compare the strings. Through usage of the system, the web server may "learn" information about the categories and the associated sets of keywords that assists in calculating the token probability for certain strings and substrings identified as tokens. For example, the web server may track the frequency at which a category selected at step 325, below, is accepted by the user (at step 330) as the correct category or declined as the incorrect category, and may increase or reduce the token probability accordingly. Thus, if the web server has processed 500 domain name searches containing the token "parts," and in 400 of the searches the user eventually approved "auto parts" as the correct category, the web server may increase the token probability for "parts" being in the "auto parts" category, and may further or instead reduce the token probability that the token is in the "guitar parts" category. Additionally or alternatively, if a subset of the tokens has been manually classified (i.e., the category or category probability/ies is/are assigned by a human data entry specialist), the web server 100 may adopt the manual classification or merge it with the automatically-developed probabilities.

If only one token is identified from the domain name string at step 305, the web server may sort the token probabilities in descending order and then proceed to the selection step 325, described below. If multiple tokens are identified from the domain name string, at step 315 the web server may calculate, for all or a subset of the possible combinations of the tokens, a joint probability for each category in the category structure or a subset thereof (e.g., one or more tiers or one or more hierarchical trees of the category structure). For example, if the domain name string is "carinsurancecards.com," and the tokens "car," "insurance," and "cards" are identified at step 305, the web server may calculate joint probabilities for the possible combinations "car insurance," "car cards," "insurance cards," and "car insurance cards." The joint probability is the probability that the combination of tokens is relevant to the category. The web server may calculate the joint probability as described for the calculation of the token probability in step 310.

At step 320, the web server may compile the token probabilities and joint probabilities for all of the tokens and token combinations analyzed, in order to determine the highest probability categories for the domain name string as a whole. In one embodiment, for each category, the token probabilities and joint probabilities are averaged to produce a final probability, and the final probabilities are sorted in descending order to determine the highest probability categories. In another embodiment, each of the token and joint probabilities may be weighted, and a separate or supplemental data model may be created to determine the coefficients by which the token and joint probabilities are modified. For example, the tokens of a joint token may be considered "probably" co-dependent (i.e., an n-gram) and the joint token may earn a higher weighted probability. The resulting probabilities for each token and joint token determine the preferred token set, which is the combination of tokens that reads on the most characters from the search string and has the highest probability of belonging to one of the categories. Determining the preferred token set may be done, in one embodiment, by counting the frequency (i.e., number of appearances) of the word set in the category title or keyword set.

At step 325, the web server selects the highest probability category as the selected category for the domain name. The selected category may have a final probability that satisfies a confidence level that the selected category is the correct category. The confidence level may be determined according to any suitable methodology or combination of methodologies for selecting a clearly favored option from a set of options. In one such methodology, the confidence level is satisfied if the final probability of the selected category exceeds the final probability of the next-highest scoring category by a desired margin, such as five percent. In another such methodology, the confidence level is satisfied if the final probability of the selected category exceeds a threshold probability, such as 30%. In another such methodology, a suitable range of the highest scoring categories, such as the top ten categories, may be presented to the user to select the appropriate category. The web server may resolve any case where there is not a clearly favored category (e.g. the final probabilities of a plurality of categories are equal or within a threshold margin) in any suitable manner. For example, the web server may select all of the categories within a desired range of final probabilities as the selected categories. In another example, the web server may submit the categories within a desired range of final probabilities to an automated or human "judge," which/who may perform further contextual analysis and select one or more of the submitted categories as the selected category (ies).

At step 330, the web server may optionally present the selected category or categories to the user and prompt the user to approve or disapprove the selected categories as the correct categories. If the user approves the selected categories, the web server may categorize the domain name and any associated website in the selected categories. If the user disapproves one or all of the selected categories, the web server may return to step 325 and select the next highest probability categories, and repeat until the proper categories are selected. A limit on "retries" of the category selection step 325 may be applied, after which the web server may prompt the user to manually enter the appropriate categories for the domain name. The web server may track the approval and disapproval of selected categories, any manual entry of categories, and any results provided by a judge, to further refine the probability calculation steps for future domain name categorizations. For example, through machine learning of user rejections and manual entries, the web server may determine that the token "apple" is equally or more relevant to computer-related categories and music categories as compared to food-related categories. The web server may further retain the selected categories, or the final probabilities for all categories compiled at step 320, to compile them with results of additional categorization methods, such as the categorization based on website content described below.

An alternative embodiment of the method of FIG. 2 may be used to categorize a website based on input other than the domain name string. The input may be a list of keywords provided by the user or obtained from the website using any suitable content scraping or other keyword identification methodology. Such methodologies may include any of the methods described in co-pending U.S. patent application Ser. No. 14/010,294, entitled "METHOD FOR AUTOMATING SEARCH ENGINE OPTIMIZATION FOR WEBSITES" and commonly owned by the Applicant for the present invention. Upon receipt of the input, the web server may begin the method of FIG. 3 at the token probability calculation step 310.

Figure 3A:
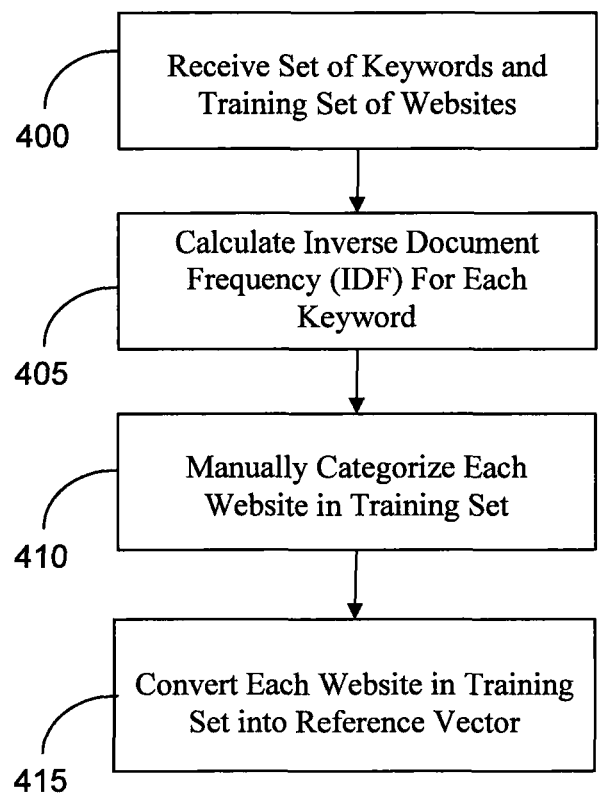
FIG. 3A is a flowchart illustrating a method for creating categorized reference vectors for a training set of websites.
Figure 3B:
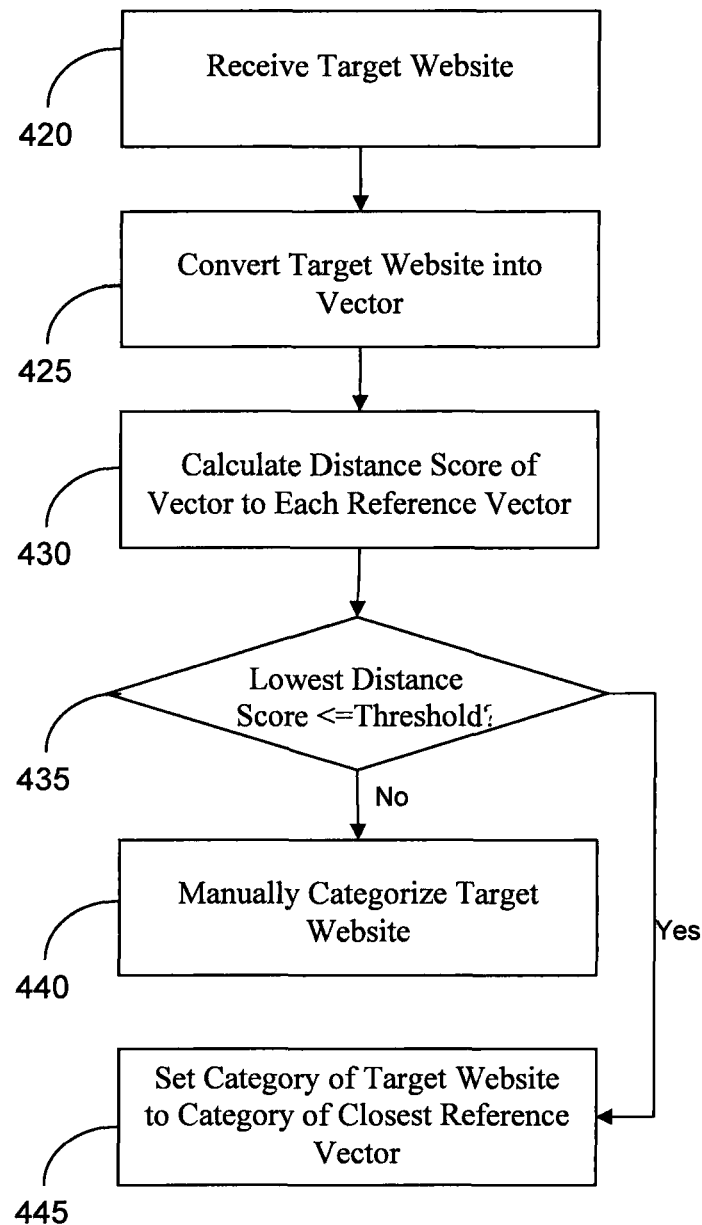
FIG. 3B is a flowchart illustrating a method for categorizing a website with respect to reference vectors.

FIGS. 3A and 3B are flowcharts illustrating a method for categorizing a target website. The method advantageously converts the target website into a vector within an n-dimensional vector space, where the vector represents the frequency of appearance of one or more keywords in the target website. The target website's vector may be compared to a set of reference vectors that represent the categories of the category structure in order to determine the proper category for the target website. As in the methods described above, the keywords represented by the vector may be obtained using any suitable methodology for obtaining keywords for a website, including tokenizing the website's domain name and scraping the keywords from the source code of one or more web pages in the website. While other methods of calculating keyword frequency may be used, the present method describes calculating a term frequency-inverse document frequency (TF-IDF) score for the keyword, in which the document is the target website. In some embodiments, including the embodiment described below and in FIGS. 3A-B, the corpus against which the document is compared may be the set of all websites publicly accessible on the Internet (i.e., all websites comprising data that can be scraped by the web server when the web server visits the domain name of the website). In other embodiments where it is not necessary to compare the target website against all websites on the internet, the corpus may comprise only a subset of the websites on the Internet. For example, the web server 100 may determine a category for the target website to a higher level of abstraction, such as a 3-digit NAICS class, and then compare the target website to only those websites on the internet that have been classified in the same 3-digit NAICS class in order to determine the target website's 4-, 5-, or 6-digit NAICS class.

Figure 4:
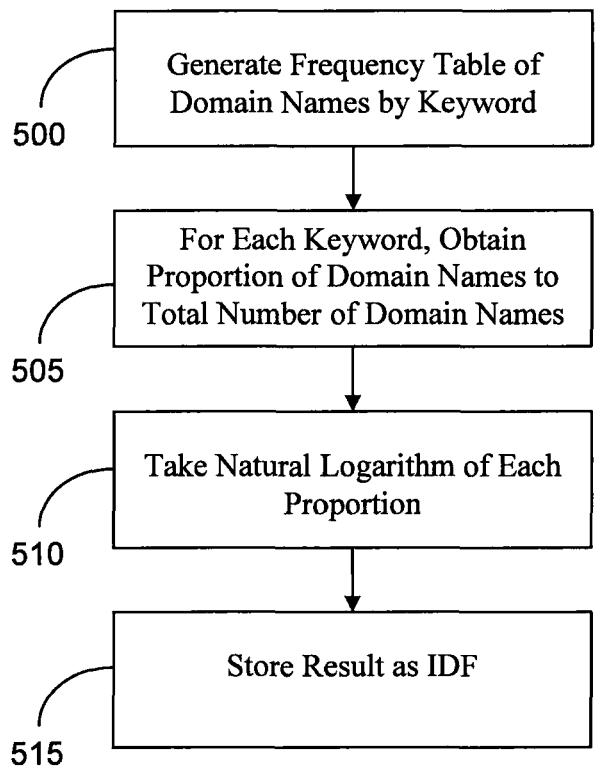
FIG. 4 is a flowchart illustrating a method for calculating inverse document frequency for keywords.

Referring to FIG. 3A, the web server may first convert a plurality of websites into reference vectors representing all or a subset of the categories in the categorization structure. At step 400, the web server may receive a set of keywords, obtained from the corpus as described above, and a set of websites that will become the reference vectors, referred to herein as the training set of websites. The corpus may include the websites in the training set, so the set of keywords may include keywords from the websites of the training set. At step 405, the web server may calculate the inverse document frequency (IDF) of each keyword in the set of keywords. The IDF is a logarithmic measurement of how frequently a website in the corpus contains the keyword. The IDF may be calculated using any suitable approach, with one example being illustrated in FIG. 4. At step 500, the web server may count the number of domains in the corpus in which each keyword appears, and may generate a domain frequency table that contains each keyword and the frequency of domain names containing the keyword (i.e., the number of domain names at which the associated website contains the keyword). At step 505, for each keyword in the frequency table, the web server may divide the domain name frequency by the total number of domain names in the corpus to obtain a domain proportion, and at step 510 the web server may take the natural logarithm of the domain proportion to obtain the IDF. Thus, the example calculation of FIG. 5 follows the formula:

$$IDF=\ln(F/D);$$

where F is the number of domains containing the keyword, and D is the number of domains in the corpus. At step 515, the web server may store the IDF in a database or keyword IDF array.

Returning to FIG. 3A, at step 410 the web server may categorize each website in the training set. To ensure fault-free assignment of categories to the websites, the categorization of the websites may be performed manually by one or more users via an interface with the web server. Alternatively, the categorization of the websites in the training set may be fully or partially automated. The websites in the training set are selected to provide a desired cross-section of the available categories in the categorization structure. For example, where a 4-6 digit NAICS code categorization structure is used, a suitable training set contains about 125 websites, each of which is properly classified in a different 4-6 digit NAICS code. Each website in the training set may be assigned its NAICS code using any suitable means, such as by storing the NAICS code in a database or in an array representing the categories of the training set websites. At step 415, the web server may convert each website in the training set into a reference vector as described below with respect to FIG. 6, and may store the reference vector together with the category assigned to its associated website.

Referring to FIG. 3B, with the training websites categorized and converted into reference vectors, the web server may automatically categorize target websites that may or may not be part of the corpus. At step 420, the web server may receive the target website by any suitable means of receiving or otherwise determining the identity of the target website. In some embodiments, the web server may receive the domain name or other identifying information for the target website from a user, an automated query or message, or another means. In other embodiments, the web server may itself identify the target website, such as by querying a database of domain names to retrieve the next uncategorized domain name in the database. At step 425, the web server may convert the target website into a target vector.

Figure 5:
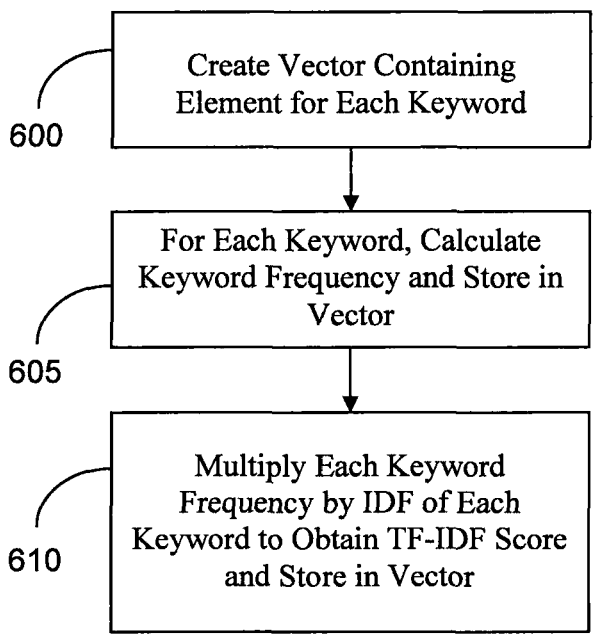
FIG. 5 is a flowchart illustrating a method for calculating TF-IDF scores for keywords in a vector.

FIG. 5 illustrates an embodiment of converting a website into a vector and may be used to convert the websites of the training set into reference vectors, at step 415 of FIG. 3A, as well as to convert the target website into a target vector at step 425 of FIG. 3B. At step 600, the web server may create a vector to represent the website. The vector may be an array or any other suitable data structure for containing n elements and representing them in an n-dimensional vector space. In particular, n may be the total number of keywords and the vector array may have n elements. At step 605, for each keyword in the set of keywords, the web server may calculate the keyword's term frequency (TF) and store the TF in the vector. In one embodiment, the TF may be a raw count of the number of times the keyword appears in the website. In another embodiment, the TF may compensate for website volume (i.e., size, word count, page count, and the like) and may be a ratio of the raw count to the maximum raw count of any term in the website. Other embodiments may utilize other methods of calculating TF.

At step 610, the web server may multiply each keyword's TF, calculated in step 605, by the keyword's IDF, calculated in step 405 of FIG. 3A, to obtain the keyword's TF-IDF score. The web server may store the TF-IDF score in the vector in place of the keyword's previously stored TF. The vector representing the website is now a vector of TF-IDF scores for each keyword in the set.

Figure 6:
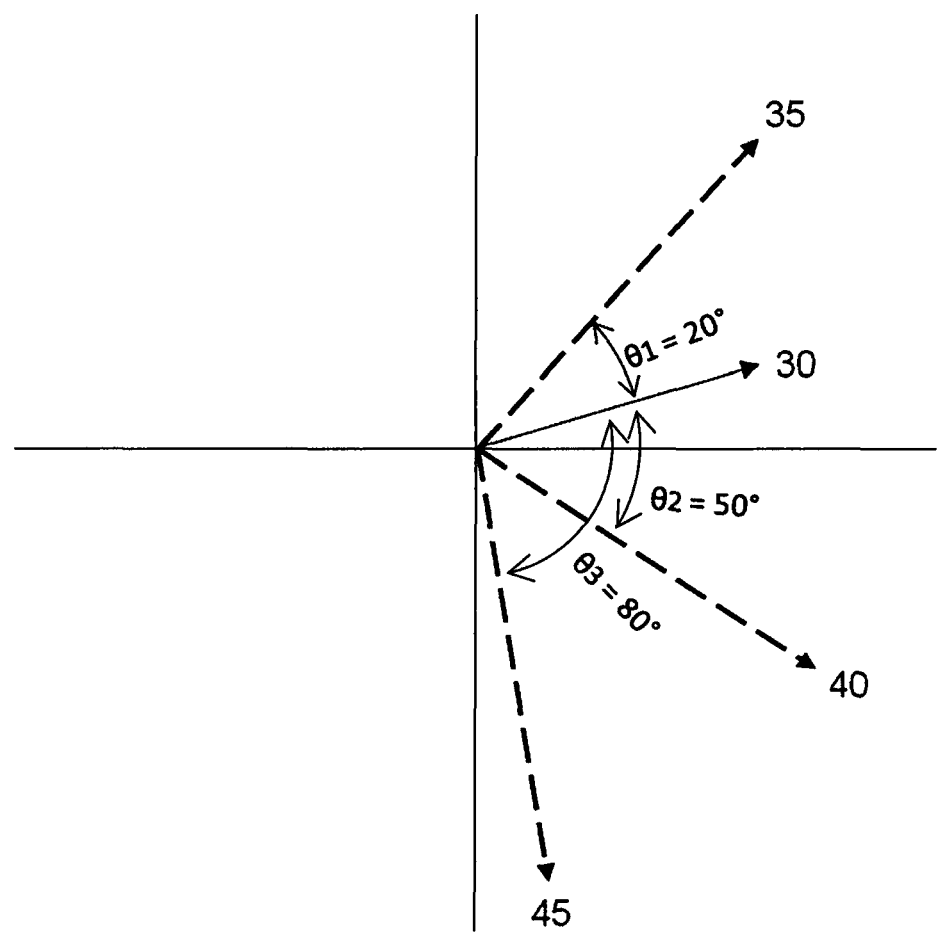
FIG. 6 is a diagram of a vector space.

For purposes of illustration, FIG. 6 is a two-dimensional representation of the n-dimensional vector space in which the target and reference vectors may be plotted. A target vector 30 may be deflected from the trajectory of a first reference vector 35 by an angle $\theta_1$, from the trajectory of a second reference vector 40 by an angle $\theta_2$, and from the trajectory of a third reference vector 45 by an angle $\theta_3$, continuing through all reference vectors. In the illustration, the angle $\theta_1$ between the target vector 30 and the first reference vector 35 is the smallest, so the website represented by the target vector may be assigned the category(ies) of the first reference vector 35.

Returning to FIG. 3B, after creating the target vector for the target website, at step 430 the web server may calculate a distance score of the target vector to each of the categorized reference vectors. The distance score is a measurement of the angle between the target vector and the reference vector when the vectors are plotted in the vector space. The lower the distance score, the more similar the keywords of the target vector are to those of the reference vector, and thus the more likely the target website belongs to the same category as the categorized website represented by the reference vector. The web server may use any suitable method of calculating the distance score. In particular, the web server may use an implementation of cosine similarity to determine the distance between the target vector and each of the reference vectors.

Figure 7:
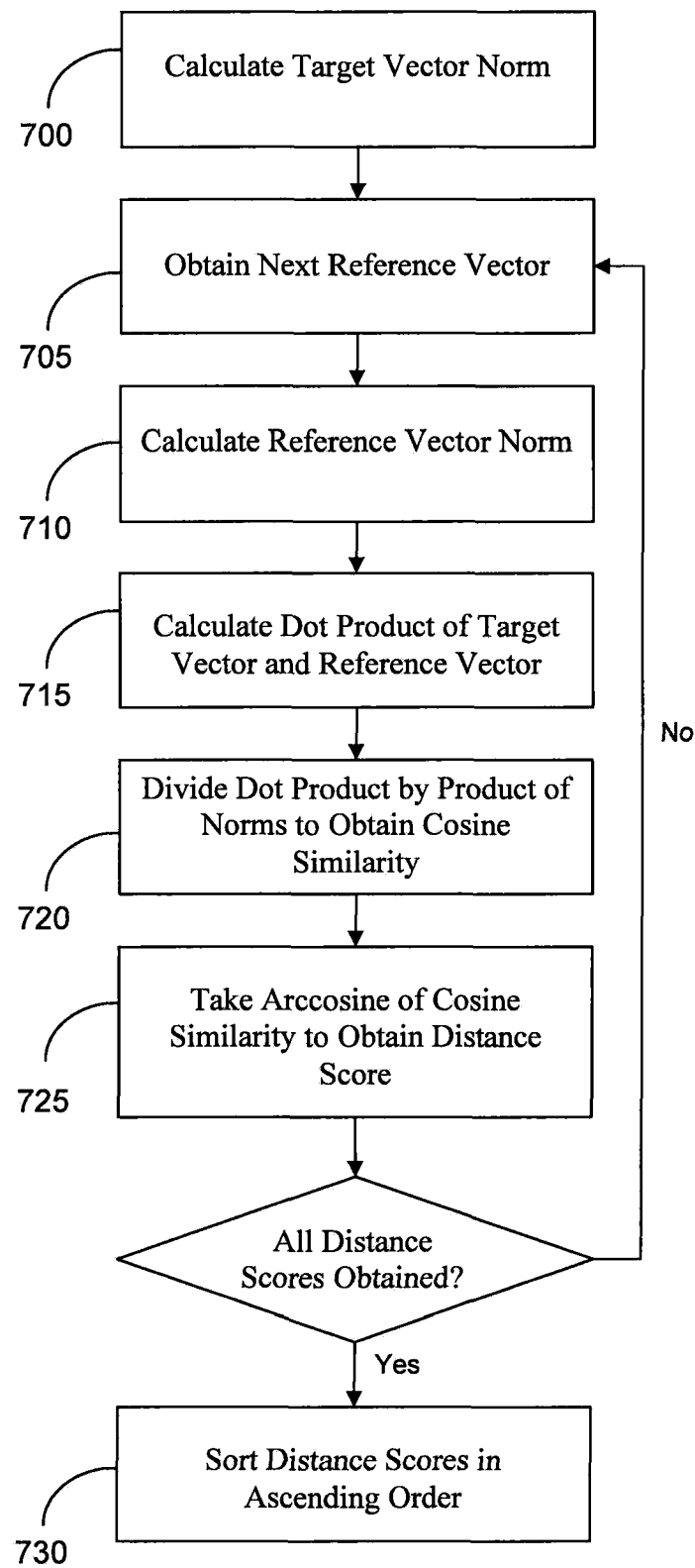
FIG. 7 is a flowchart illustrating a method for calculating distance scores for a target vector.

FIG. 7 illustrates an embodiment of applying cosine similarity to the target vector and a reference vector in order to determine the distance score. At step 700, the web server may calculate the norm of the target vector using any suitable calculation method. At step 705, the web server may retrieve the next reference vector to be compared from the set of reference vectors. At step 710, the web server may calculate the norm of the reference vector. At step 715, the web server may calculate the dot product of the target vector and the reference vector, using any suitable formula for calculating the dot product of two vectors.

At step 720, having obtained the dot product and the norms of the target vector and the reference vector, the web server may obtain the cosine similarity of the vectors by dividing the dot product by the product of the two norms. At step 725, the web server may convert the cosine similarity into a distance score by taking the arccosine of the calculated cosine similarity. With the distance score calculated, the web server may determine if any reference vectors remain to be compared to the target vector, and if so, the web server may return to step 705 and continue the process. If all reference vectors have been compared, the web server may sort the distance scores in ascending order for later use.

Returning to FIG. 3B, with the distance scores calculated, at step 435 the web server may determine which of the distance scores are within a certain accuracy threshold, beyond which the categories of the reference vectors associated with the distance scores are likely irrelevant. For example, a distance score of 1.5 or higher calculated with the method of FIG. 7 indicates that the target website does not pertain to the category(ies) of the reference vector. In some embodiments, the accuracy threshold may be set (based on the method of calculating the distance scores) so that the categorization precision approaches 100% accuracy. If none of the distance scores are within the accuracy threshold, the web server may proceed to step 440 and allow the website to be electronically categorized. If one or more of the distance scores is within the threshold, at step 445 the web server chooses the reference vector with the lowest distance score and sets the category of the target website to the category of the reference vector.

The present disclosure describes preferred embodiments with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included are generally set forth as logical flow-chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow-chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present invention has been described in terms of one or more preferred embodiments, and it should be appreciated that many equivalents, alternatives, variations, and modifications, aside from those expressly stated, are possible and within the scope of the invention.

The invention claimed is:

1. A method, comprising:
   receiving, by at least one server communicatively coupled to a network, a list of a plurality of first keywords, the plurality of first keywords obtained by scraping each web page of a plurality of web pages in a target website, each of the plurality of web pages having at least one of the first keywords obtained therefrom;
   converting, by the at least one server, the list into a target vector representing the target website, the target vector comprising a plurality of elements each associated with a corresponding second keyword of a plurality of second keywords, the plurality of second keywords being selected from a corpus of websites, by:
      counting the number of times each second keyword of the plurality of second keywords appears in the list to produce a corresponding frequency of appearance of each second keyword in the target website; and
      storing, in each element of the plurality of elements, the corresponding frequency of appearance of the corresponding second keyword;
   comparing, by the at least one server, the target vector to a plurality of reference vectors each being assigned one or more categories of a category structure; and
   assigning, by the at least one server, the assigned one or more categories of the closest matching reference vector to the target website.

2. The method of claim 1, wherein the corpus of websites comprises all publicly available websites on the Internet.

3. The method of claim 1, wherein the corpus of websites comprises all publicly available websites previously categorized in one or more of the categories.

4. The method of claim 1, wherein the corpus of websites comprises all publicly available websites previously categorized in one or more of the categories that are assigned to one or more of the reference vectors.

5. The method of claim 1, wherein the plurality of second keywords is obtained by scraping the websites of the corpus for website data and identifying the second keywords from the website data.

6. The method of claim 5, wherein the corresponding frequency of appearance of each second keyword of the plurality of second keywords is a term frequency-inverse document frequency (TF-IDF) score for the second keyword, the method further comprising calculating, by the at least one server, the TF-IDF score for each of the second keywords from the input and the corpus of websites.

7. The method of claim 6, wherein calculating the TF-IDF score for each of the second keywords comprises:
   calculating an inverse document frequency (IDF) for the second keyword;
   counting the number of appearances of the second keyword in the plurality of first keywords obtained from the plurality of web pages in the target website;
   multiplying the number of appearances of the second keyword by the IDF of the second keyword to obtain the TF-IDF score for the second keyword; and
   storing the TF-IDF score in the element of the target vector associated with the second keyword.

8. The method of claim 1, further comprising:
   receiving, by the at least one server, a training set of websites;
   receiving, by the at least one server, assigned categories for each of the websites in the training set; and
   converting each of the websites in the training set into one of the reference vectors, each of the reference vectors comprising elements signifying the appearance of the plurality of second keywords on the associated website.

9. The method of claim 8, further comprising calculating, by the at least one server, an inverse document frequency (IDF) for each of the plurality of second keywords by:
   calculating the number of websites in the corpus that contain the second keyword, the corpus including the websites in the training set and one or both of the input and the target website;
   calculating a document frequency comprising the number of websites in the corpus that contain the second keyword, divided by the number of websites in the corpus; and
   calculating the natural logarithm of the document frequency to obtain the IDF.

10. The method of claim 9, wherein converting each of the websites in the training set into a corresponding reference vector of the plurality of reference vectors comprises:
    creating the corresponding reference vector containing an element for each of the plurality of second keywords; and
    for each of the second keywords:
       counting the number of appearances of the second keyword in the website in the training set;
       multiplying the number of appearances of the second keyword by the IDF of the second keyword to obtain a TF-IDF score for the second keyword; and
       storing the TF-IDF score in the element of the corresponding reference vector associated with the second keyword.

11. The method of claim 1, wherein comparing the target vector to the plurality of reference vectors comprises calculating a distance score of each of the reference vectors from the target vector, the closest matching reference vector having the lowest distance score.

12. The method of claim 11, wherein calculating the distance score for each reference vector comprises:
    calculating the target vector norm;
    calculating the reference vector norm;
    calculating the dot product of the target vector and the reference vector;
    dividing the dot product by the product of the target vector norm and the reference vector norm to obtain a cosine similarity value; and
    calculating the arccosine of the cosine similarity value to obtain the distance score.

13. The method of claim 12, wherein the corpus comprises all publicly available websites on the Internet.

14. A system, comprising:
    at least one server computer in communication with a network, the at least one server computer including a processor configured to:
       receive a list of a plurality of first keywords each collected from one of a plurality of web pages of a target website, each of the plurality of web pages having at least one of the first keywords collected therefrom;
       create a target vector representing the target website, the target vector comprising a plurality of elements each signifying a frequency of appearance of a corresponding second keyword of a plurality of second keywords within the target website, the plurality of second keywords being selected from a corpus of websites;

determine, for each second keyword of the plurality of second keywords, a corresponding count of the number of times the second keyword appears in the list;

determine, for each element of the plurality of elements, a corresponding value based on the corresponding count of the corresponding second keyword;

compare the target vector to a plurality of reference vectors each being assigned one or more categories of a category structure; and assign the assigned one or more categories of the closest matching reference vector to the target website.

15. The system of claim 14, wherein the corpus comprises all publicly available websites on the Internet.

16. The system of claim 14, wherein comparing the target vector to the plurality of reference vectors comprises calculating a distance score of each of the reference vectors from the target vector, the closest matching reference vector having the lowest distance score.

17. The system of claim 14, wherein the processor is further configured to, for each second keyword of the plurality of second keywords:

calculate a corresponding inverse document frequency (IDF) for the second keyword;

multiply the corresponding count of the second keyword by the IDF of the second keyword to obtain a TF-IDF score for the second keyword; and store the TF-IDF score in the corresponding element, of the plurality of elements of the target vector, that is associated with the second keyword.

18. The system of claim 14, wherein the category structure comprises one or more hierarchical trees in which the categories are arranged into a plurality of tiers.

19. The system of claim 18, in which the category structure comprises North American Industry Classification System codes.

20. The system of claim 18, wherein each tier of the plurality of tiers is associated with a corresponding industry and, to assign the assigned one or more categories of the closest matching reference vector to the target website, the processor is configured to:

determine that the assigned one or more categories are associated with a first tier of the plurality of tiers; and associate the target website with the corresponding industry of the first tier.

\* \* \* \* \*